May 31, 1966     M. C. DEPP     3,253,342
COMPENSATED COMPASS SYSTEM
Filed Jan. 25, 1961     3 Sheets-Sheet 1

INVENTOR.
MARLIN C. DEPP
BY
ATTORNEY

INVENTOR.
MARLIN C. DEPP
BY
ATTORNEY

INVENTOR.
MARLIN C. DEPP

3,253,342
COMPENSATED COMPASS SYSTEM
Marlin C. Depp, Wantagh, N.Y., assignor to Sperry Rand Corporation, Great Neck, N.Y., a corporation of Delaware
Filed Jan. 25, 1961, Ser. No. 84,911
10 Claims. (Cl. 33—224)

This invention relates to earth's magnetic field sensing devices and more particularly to means for eliminating the effect produced in such devices by known extraneous deviation magnetic fields so that the output signal of the devices represent substantially only the effect produced by the earth's magnetic field. The invention is applicable to compensate compass devices of the type known as flux valves, although it is to be understood that the invention is useful in systems using other magnetic field sensing devices. An example of such a flux valve magnetic field detection device may be found in U.S. Patent 2,383,461 issued August 28, 1945 and assigned to applicant's assignee. Such devices may be used directly as a direction reference or as a direction reference in a slaved gyromagnetic compass system. A typical system of this latter type is disclosed in U.S. Patent 2,357,319 issued September 5, 1944 and assigned to applicant's assignee.

In most modern aircraft, accurate heading information is derived from a directional gyro which is slaved to a remote compass transmitter. One type of remote compass transmitter is a flux valve, which is so designed that the sensitive element thereof ideally senses only the horizontal component of the earth's magnetic field, that is, the flux valve is so mounted in the aircraft that the pick-up or output windings thereof are maintained substantially substantially horizontal. The aircraft's magnetic heading is the angular difference between the horizontal component of the earth's magnetic field and the horizontal projection of the aircraft's longitudinal axis.

The sensitive element of a flux valve consists essentially of a core element of highly permeable material upon which is wound suitable energizing and output or pick-up windings. This core element is generally in the shape of an equiangular Y, the pick-up coils being mounted on the legs of the core, and the assembly being maintained generally horizontal by means of a pendulous mass and gimbal support. However, it will be understood that a cruciform or a delta-shaped core element alternatively may be employed. The flux valve is so excited that each pick-up coil senses a component of any magnetic field in which it lies and the three coils together sense that portion of any magnetic field in the plane of the coils. Since these coils sense any magnetic fields in which they lie, the output of the coils may be in error due to the magnetic fields produced by the aircraft's structure itself, or by armament or cargo carried by the craft, or by electronic equipment operating within the craft. The high accuracy requirements placed on a compass system by present day bombing, navigation, and photo flight-line equipments have dictated the need for extreme accuracy in the measurement of the azimuthal heading of the vehicle, and small errors, heretofore considered negligible, now must be determined and accurately compensated.

Heretofore, heavy bomber or large cargo-type aircraft ground swinging, i.e., the determination of the proper orientation of the flux valve within the aircraft and the determination of extraneous magnetic fields produced within or by the aircraft, has been accomplished by swinging the aircraft on the ground, that is, rotating the aircraft to various headings, determining the magnitude and direction of any errors in the flux valve reading, and then compensating the flux valve for these errors. Methods by which the magnitude and direction of the above-noted errors may be determined is described in detail in U.S. Patents 2,887,872 and 2,887,873, assigned to applicant's assignee. In my U.S. Patent 2,852,859 I disclosed a method for compensating a flux valve to eliminate the errors produced by the extraneous deviation magnetic fields. The method described in said patent incorporates the use of external sources of electrical potential and an arrangement of potentiometers whereby I couple into the windings of the flux valve compensating currents which produce magnetic fields which are equal in magnitude and opposite in direction to the extraneous deviation magnetic fields. This system is quite useful but has the disadvantage that considerable additional equipment is required, and has the further disadvantage that should the extraneous deviation magnetic fields change or disappear, the compensating means will not operate automatically to account for these changed conditions.

It therefore is an object of this invention to provide means for automatically eliminating from a magnetic field sensing device the effect produced by a known extraneous deviation magnetic field.

Another object of this invention is to provide a magnetic compass system responsive substantially only to the horizontal component of the earth's magnetic field.

A further object of this invention is to provide simple and automatic means for eliminating from a magnetic compass system error signals produced by a known extraneous deviation magnetic field.

Another object of this invention is to provide a simple method and apparatus for automatically eliminating from a magnetic compass system errors caused by known extraneous deviation magnetic fields, the compensation means having no disturbing effect on the system in the event of the removal of said deviation field.

These and other objects and advantages, which will become more apparent from the description and claims below, are achieved in a preferred embodiment of the invention by installing two flux valves in a craft in 180° physical relationship with respect to each other; that is, one is installed in reverse relationship with respect to the other. The two flux valves are located at positions on the craft where the horizontal component of the earth's magnetic field is in the same direction and substantially equal, and the deviation magnetic field is in the same direction but its magnitude at one position is greater than its magnitude at the other position by a factor D. Corresponding coils of the two flux valves are interconnected together by means of respective networks which include impedance means such as variable resistors. By adjusting the values of the variable resistors in each interconnecting network, the magnitudes of the signals from the flux valve located at the position where the deviation field is stronger by a factor D are decreased by the factor 1/D so that the deviation field signal components from the two flux valves are substantially equal. Because of the reversed relationship of the flux valves, the signals of the corresponding coils combine in phase opposition, and since the deviation signal components now are substantially equal they substantially cancel, leaving only a signal component representing the horizontal component of the earth's magnetic field. This substantially error-free signal then is utilized in a conventional compass system to provide an accurate indication of heading of the craft.

The invention will be described by referring to the accompanying drawings wherein.

Figure 1:
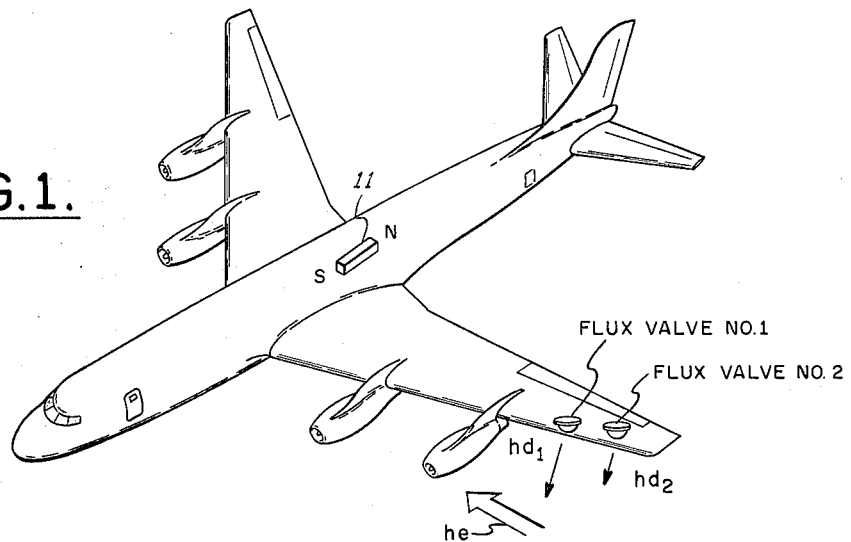
FIG. 1 is a sketch showing the position on an aircraft of the magnetic field sensors, such as flux valves, and also illustrates the relative directions of the horizontal components of the earth's magnetic field and the extraneous deviation magnetic field.

Referring now more particularly to the drawings, FIG. 1 is an illustration of an aircraft having two flux valves employed in this invention mounted in one of its wings. The direction of the horizontal component of the earth's magnetic field is represented by the vector $h_e$, and the horizontal component of the extraneous deviation field is represented at the two flux valves by the respective vectors $h_{d1}$ and $h_{d2}$. The source of the external deviation magnetic field in the aircraft is represented by a bar magnet 11, it being understood that this representation is merely for convenience. In practice, this source would be the aircraft structure itself, armament, cargo, or operating electronic equipment. The two flux valves are positioned on the aircraft so that the horizontal component of the earth's magnetic field is in the same direction and of equal magnitude in both of the valves. Further, the valves are positioned so that the horizontal component of the extraneous deviation magnetic field is in the same direction in the two flux valves and the magnitude of the deviation field at the two valves is unequal and related by a known factor D. As an example in the following discussion, the strength of the deviation field at flux valve 1 will be considered to be twice the magnitude at flux valve 2, i.e., $D=2$. The direction and relative magnitudes of the deviation field at the two flux valves will not change in proportion relative to each other with changes in heading of the craft because the disturbing source is fixed with respect to the craft. The direction of the earth's magnetic field will of course change with respect to the flux valves as the heading of the craft changes.

Figure 2:
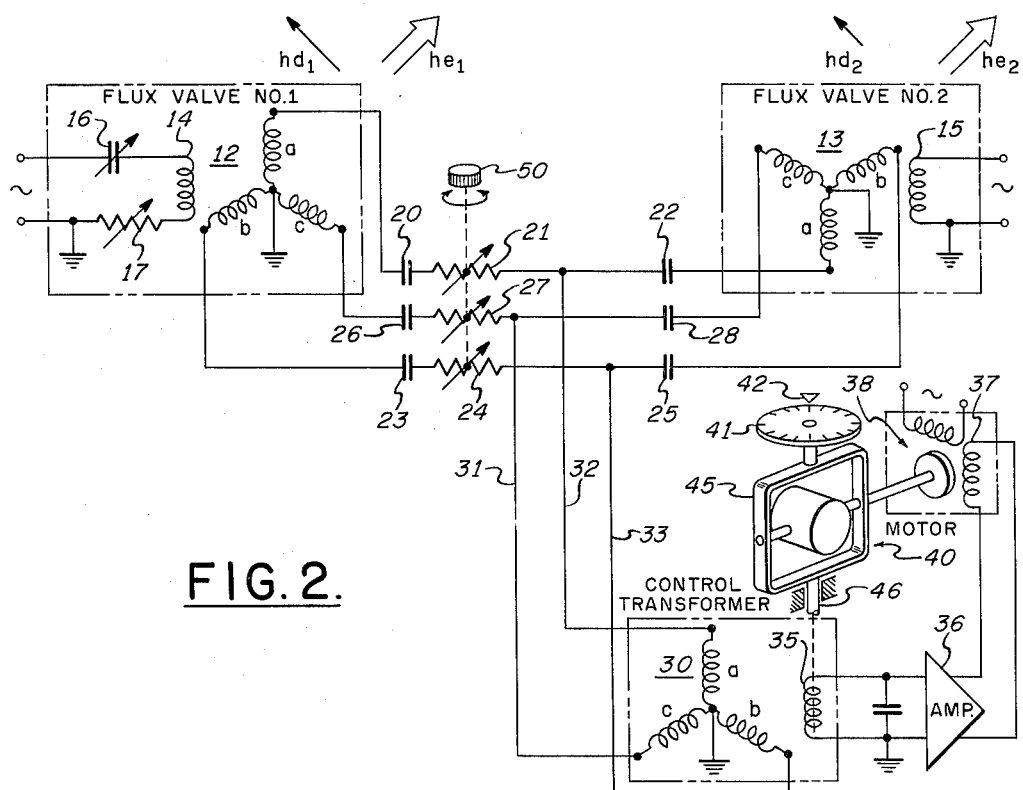
FIG. 2 is a schematic circuit diagram illustrating a gyromagnetic compass system embodying the present invention.

The manner in which the deviation errors automatically are eliminated in a slaved gyro-magnetic compass system is illustrated in FIG. 2, wherein the two flux valves 12 and 13 each is comprised of Y-connected pick-up coils $a$, $b$ and $c$ angularly disposed at 120° with respect to each other. The flux valves further are comprised of respective exciting windings 14 and 15 which are excited by sources of A.C. voltage. The input circuit for exciting winding 14 includes a variable capacitor 16 and a variable resistor 17 for adjusting the phase of the exciting voltage in winding 14. In accordance with this invention, the two flux valves 12 and 13 physically are oriented 180° with respect to each other. That is, flux valve 12, for example, may be positioned so that the axis of its coil $a$ is parallel to the longitudinal axis of the aircraft with its outward end directed toward the front end of the aircraft. Flux valve 13 therefore will be positioned with its coil $a$ parallel to said axis and its outward end directed toward the tail of the aircraft. The respective coils $a$—$a$ of flux valves 12 and 13 are interconnected through capacitor 20, variable resistor 21 and capacitor 22. Similarly, the respective coils $b$—$b$ of the two valves are interconnected through capacitor 23, variable resistor 24 and capacitor 25, while the coils $c$—$c$ of the two valves are interconnected through capacitor 26, variable resistor 27 and capacitor 28.

Variable resistors 21, 24 and 27 are adjusted during operation to attenuate the signals from the respective coils of flux valve 12 by a factor $1/D$, D being the factor by which the magnitude of the deviation field at flux valve 12 exceeds the magnitude of the deviation field at flux valve 13.

A control transformer 30, having Y-connected coils $a$, $b$ and $c$, is connected in parallel to interconnected flux valves 12 and 13 by means of leads 31, 32 and 33 so that the respective coils of the control transformer 30 are connected to the similarly lettered coils of the two flux valves. The rotor winding 35 of control transformer 30 is connected through control amplifier 36 to a field winding 37 of phase sensitive reversible motor 38. The position of compass card 41 relative to fixed index 42, which is aligned with the heading of the aircraft, then will provide an indication of the aircraft heading relative to the earth's magnetic field. The servo loop which causes the gyroscope 40 to be slaved to the horizontal component of the earth's magnetic field is completed by the shaft 46 which mechanically couples vertical ring 45 of gyroscope 40 to the rotor 35 of control transformer 30.

Immediately above flux valves 12 and 13, FIG. 2, are vectors intended to represent the relative magnitudes and directions of the horizontal components of the earth's magnetic field $h_{e1}$ and $h_{e2}$, and the deviation fields $h_{d1}$ and $h_{d2}$ at the respective flux valve positions. The two fields at each flux valve are sensed by the pick-up coils of the flux valves. Because flux valve 13 is oriented 180° with respect to flux valve 12, voltages induced in the corresponding coils $a$—$a$, $b$—$b$, and $c$—$c$ of the two valves will be in phase opposition and will tend to cancel each other. The deviation field error signal components in the output signals of the coils of flux valve 12 are greater than the deviation error signal components from flux valve 13 by a factor D, so in order to completely cancel these error signals, variable resistors 21, 24 and 27 are adjusted to attenuate the respective signals from flux valve 12 by the factor $1/D$. Now the deviation error signal components of the two flux valves are equal and the combination of the signals from the two flux valves in phase opposition will cause the deviation error signal components to substantially cancel, leaving only signal components due to the earth's magnetic field, as now will be more fully explained.

Because each coil of a flux valve senses only the component of a magnetic field substantially parallel to its axis, the effects on the output signal of a coil produced by the deviation field and by the horizontal component of the earth's field are directly additive, so that in analyzing the effects of the two fields on the output signal of a coil, the effect of each field on the output signal of a coil may be considered separately, and then the effects of the two fields may be directly combined to obtain the resultant output signal. Therefore, in analyzing the operation of the embodiment of this invention illustrated in FIG. 2, reference may be made to FIG. 3 wherein the scalars shown therein represent the signals due to horizontal components of the deviation field and the earth's field sensed by a pair of corresponding coils, coils $a$—$a$ for example, of the two flux valves.

In FIG. 3a, scalars $v_{d1}$ and $v_{d2}$ represent the magnitudes of the deviation signals produced in the respective coils $a$—$a$ of flux valves 1 and 2 by the horizontal component of the deviation field, and $v_{e1}$ and $v_{e2}$ respectively represent the magnitudes of the signals produced by the horizontal component of the earth's magnetic field. The magnitudes of these scalars are in accordance with the previous assumptions relating to the fields, i.e. the earth's field is in the same direction and of the same magnitude of the two flux valves, while the deviation field is in the same direction but its magnitude at one flux valve is D ($D=2$) times its magnitude at the other valve.

FIG. 3b represents the situation where the magnitude of the signal from flux valve 1 has been attenuated by the factor $1/D$ by the variable resistor 21, and the signals from the two valves are combined in the interconnecting network comprised of capacitors 20 and 22 and resistor 21. The signals combine in phase opposition, as illustrated, because flux valve 2 is oriented in the fields at 180° from the orientation of flux valve 1. It may be seen that the signals $v_{d1}/2$ and $v_{d2}$ now are equal in magnitude since $v_{d2}=\frac{1}{2}v_{d1}$. On the other hand, $v_{e2}$ is twice the magnitude of $v_{e1}/2$ because originally $v_{e1}=v_{e2}$. With these conditions present, the resultant effect is shown in FIG. 3c wherein the signals due to the deviation fields completely cancel and the only signal remaining in the system is the signal due to the earth's magnetic field, $v_{e1}/2$. Therefore, the only signal present on lead 32, FIG. 2, is a signal representing the horizontal component of the earth's field. A similar analysis may be made for the other pairs of coils b—b and c—c.

In the operation of the slaved gyro-magnetic compass system illustrated in FIG. 2, the flux valve signal transmitters 12 and 13 function in a manner just described with regard to coils a—a to produce an output signal $v_{e1}/2$ from each coil representing only the horizontal component of the earth's magnetic field. The respective resultant signals from the interconnected coils a—a, b—b, c—c of flux valves 12 and 13 are coupled over leads 31, 32 and 33 to the coils of the stator winding of control transformer 30. In the event that the rotor winding 35 of control transformer 30 is not in its null position, a voltage will be induced therein and coupled to control amplifier 36. The output signal of control amplifier 36 is coupled to winding 37 of motor 38 to cause directional gyroscope 40 to precess. The vertical ring 45 of gyroscope 40 is mechanically linked by connecting means 46 to rotor 35 of control transformer 30 and will cause rotor winding 35 to rotate until it seeks its null position. In this position, the directional gyroscope 40 is slaved to the horizontal component of the earth's magnetic field and will indicate the aircraft's true magnetic heading.

Another way of explaining the present invention is to say that flux valve 12 senses the deviation field and its output signals are operated upon by variable resistors 21, 24 and 27 to make the deviation error signal components equal to the corresponding deviation error signal components produced by flux valve 13. The error signal components of flux valve 12 then are coupled to flux valve 13 to cancel the deviation error signal components produced in flux valve 13.

One of the particularly advantageous features of this invention is that, in addition to its simplicity, the accuracy of the system will not be disturbed even if the source of the deviation field is completely eliminated, as by the launching of a missile, or dropping or removal of cargo or armament. Should this occur, the output signals of the two flux valves will represent only the earth's magnetic field, and the subtraction of one signal from the other still leaves only a signal representing the earth's field. Similarly, the compensating effect of this invention will not be affected if the disturbing source should change in magnitude so long as the separation between the two flux valves is small compared to their separation from the disturbing source.

In the previous discussion it was assumed that the magnitudes of the deviation signals in the two valves were known so that variable resistors 21, 24 and 27 could be adjusted to make the deviation signals substantially equal, and thus cancel. This obviously requires that the magnitudes of the deviation signals in the two flux valves first be determined. One way in which this may be done is to completely eliminate from the output signals of the two flux valves the components of the signals due solely to the horizontal component of the earth's magnetic field, thus leaving only the signals due to the horizontal component of the deviation field which then may be readily determined. A method for accomplishing this now will be explained.

Figure 4:
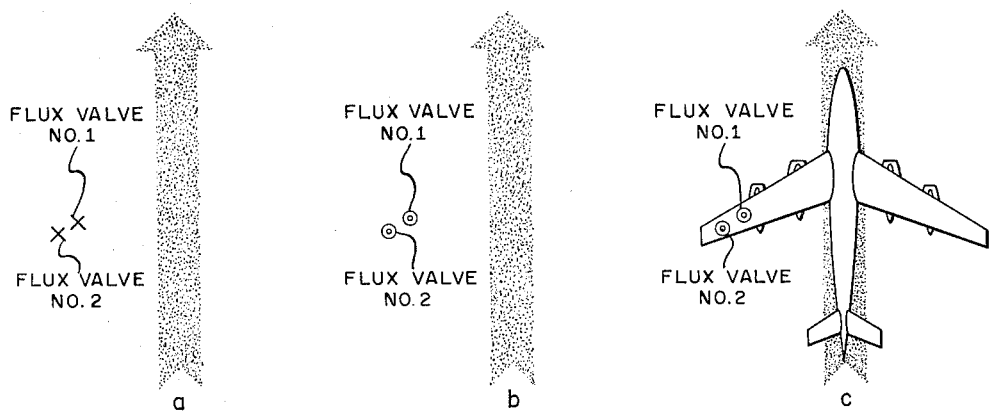
FIG. 4 is a series of sketches used to help explain the method by which the calibration of the system of the invention is carried out, and particularly is used to explain how the earth's field component of the flux valve output signals is cancelled in order to accurately determine the magnitude of the deviation error signals.
Figure 5:
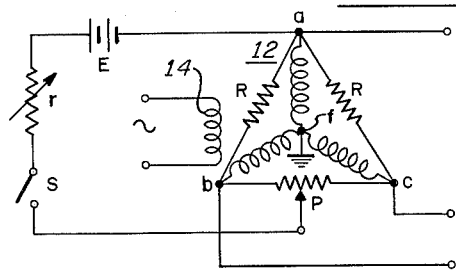
FIG. 5 is a schematic circuit diagram illustrating a compensating network used to substantially eliminate the earth's magnetic field signal from a flux valve.

The relative positions of the two flux valves on the aircraft will have been determined previously by a magnetic survey of the first aircraft of this type, it is being assumed that these relative positions are as shown in FIG. 1. Next, a stable magnetic area is selected which is substantially free of any external deviation magnetic fields. At this site the direction of the horizontal component of the earth's magnetic field is determined accurately, and a position is chosen and accurately defined where the aircraft will be aligned with the direction of the earth's field. Two ground marks then are made, as illustrated in FIG. 4a, which represent the relative positions of the two flux valves with respect to each other and with respect to the position they will occupy on the aircraft when it is in position at the site. With the aircraft removed from this site, the two flux valves are respectively positioned at the marks 1 and 2, as illustrated in FIG. 4b, with flux valve number 1 being aligned to indicate magnetic north and flux valve number 2 being oriented 180° with respect thereto. A compensating network, as illustrated in FIG. 5, then is connected to each one of the flux valves. The compensating network is comprised of fixed resistors R of equal values respectively connected between coils a–b and a–c. A source of potential E, a variable resistor r, and a switch s are coupled between point a and the variable tap of potentiometer P. With the energizing coil 14 of flux valve 12 energized, and with switches closed, variable resistor r and the center tap of potentiometer P are adjusted until a voltage null appears between points a–f and between points b–c. With voltage nulls across these points, the signals induced in flux valve 12 by the horizontal component of the earth's magnetic field has been completely cancelled by the compensating network. The values of the voltage source E, variable resistor r, and the potentiometer setting are recorded. Both flux valves are nulled in the same manner.

Having aligned each of flux valves parallel to the earth's magnetic field and having cancelled the earth's magnetic field effect in each of the flux valves, the flux valves then are disconnected and installed in the aircraft, which now is positioned at the site, FIG. 4c, at relative positions corresponding to the positions they occupied during the compensating procedure just described. The same, or identical, compensating networks then are connected to each of the flux valves and the values of the voltage sources, the settings of the variable resistors r and potentiometers P which were recorded during the calibration procedure are set into the calibrating networks. The two flux valves then are interconnected into the slaved gyro-magnetic compass system and the system is energized with the compensating network in operation. The respective components of the output signals of flux valves due to the horizontal component of the earth's magnetic field will be completely cancelled and the only output signals from the two flux valves will be due solely to the horizontal component of the extraneous deviation magnetic field.

The rotor of control transformer 30, FIG. 2, then is rotated until a maximum output signal from the rotor winding is attained. Next, variable resistors 21, 24 and 27 are adjusted by means of knob 50 until a null is attained in the output signal of rotor winding 35 of control transformer 30. Now the deviation signals due to the horizontal component of the extraneous deviation magnetic fields are cancelled from the system. The compensating networks now may be removed, or disconnected, rotor 35 positioned in its null position, and the compass system is ready for operation substantially free from any deviation signals.

Figure 6:
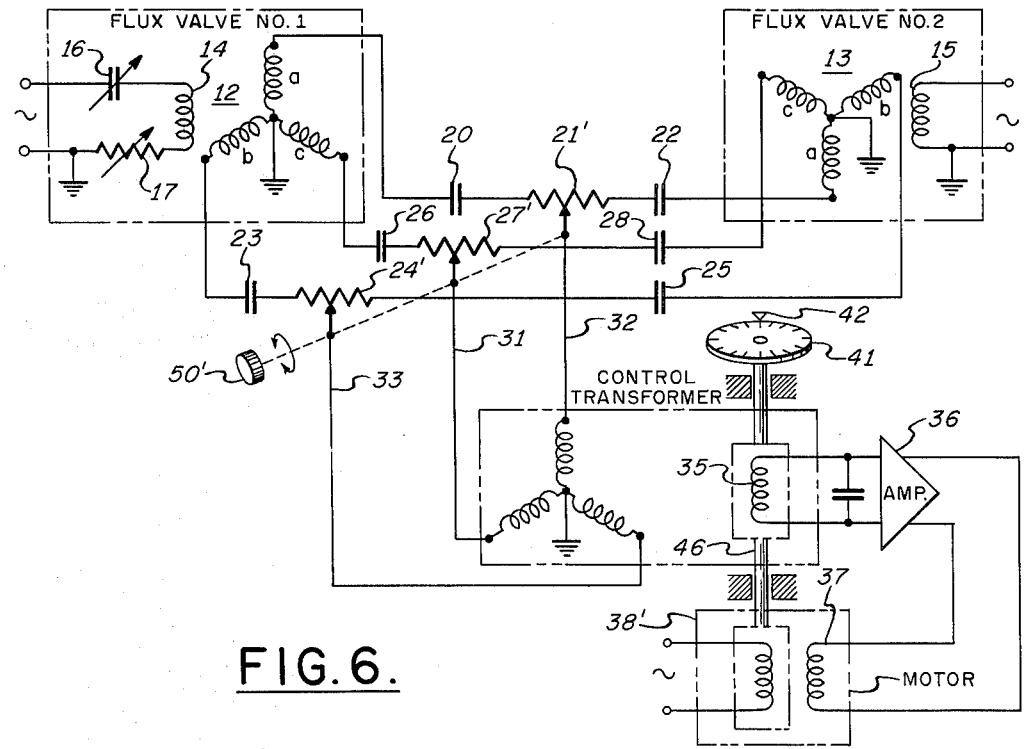
FIG. 6 is a schematic circuit diagram illustrating another embodiment of the present invention.

The deviation field compensating means of this invention also may be employed in the compass repeater system illustrated in FIG. 6. The flux valves 12 and 13 and the interconnecting networks therebetween are substantially identical to those illustrated in FIG. 2, except that the variable resistors 21, 24 and 27 of FIG. 2 have been replaced by potentiometers 21', 24' and 27'.

During the calibration procedure when the compensating networks of FIG. 5 are coupled to the respective flux valves to cancel the earth's magnetic field component, the slidable taps of potentiometers 21', 24' and 27' are adjusted by means of knob 50' until the deviation error signals cancel.

The remainder of the compass repeater system is conventional and is comprised of a motor 38' coupled through control amplifier 36 to the rotor winding 35 of control transformer 30. Shaft 46 interconnects the rotor of motor 38', the rotor of control transformer 30 and compass card 31 of the direction indicator. This arrangement is conventional and further explanation is believed unnecessary.

Figure 3:
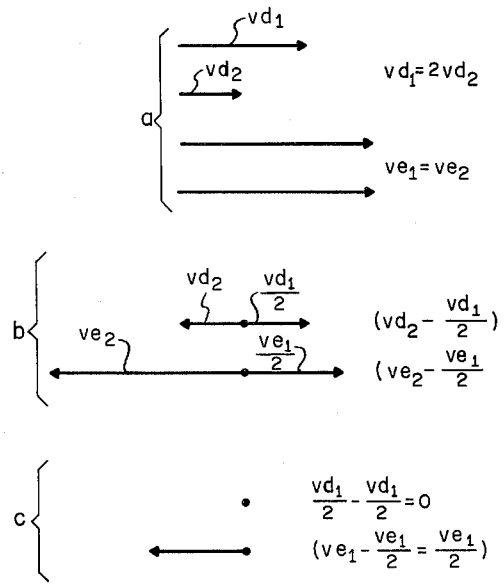
FIG. 3 is a series of vector diagrams used to help explain a feature of this invention.
Figure 7:
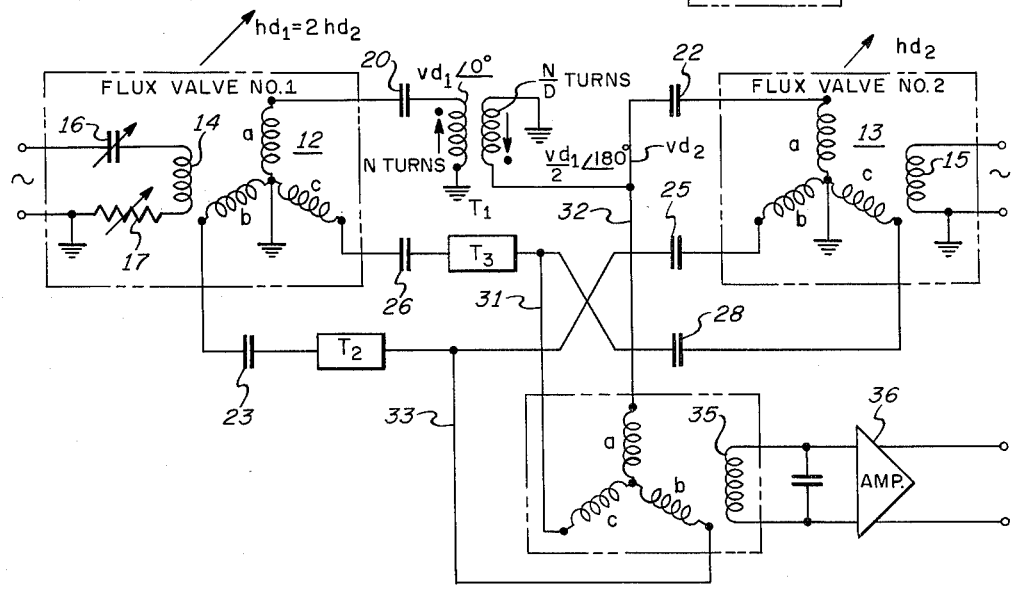
FIG. 7 is a simplified schematic diagram of an alternative embodiment of the present invention.

An alternative embodiment of the present invention is illustrated in FIG. 7 wherein flux valves 12 and 13 are shown as being oriented in the same direction with respect to each other, rather than 180° as illustrated in FIGS. 2 and 6. A further difference appears in the interconnecting networks between corresponding coils a—a, for example, of the flux valves. For simplicity of illustration and description, only one interconnecting network is shown, it being understood that the interconnecting networks between coils b—b and c—c are identical. Transformer $T_1$ is a step-down transformer wherein the ratio of the primary to secondary turns is equal to D, D being the factor by which the magnitude of the deviation field at flux valve 12 exceeds the magnitude of the deviation field at flux valve 13. Also, the windings of transformer $T_1$ are arranged so that the signal on the secondary winding is 180° out of phase with the signal on the primary winding. Thus, by means of transformer $T_1$ in the intercoupling network between coils a—a of flux valves 12 and 13, the magnitude of the deviation signal $v_{d1}$ is made equal in magnitude and opposite in sense to the deviation signal $v_{d2}$ from flux valve 13 and the deviation error signals in the two flux valves will substantially cancel. The output signals from the two flux valves representing the earth's magnetic field will combine in the same manner as illustrated in FIG. 3, thus leaving an error-free signal representing only the horizontal component of the earth's field.

It will be obvious that other arrangement similar to that shown in FIG. 7 also may be employed. For example, the 180° relationship between flux valves 12 and 13 may be maintained in the same manner as illustrated in FIGS. 2 and 6, and the windings of transformer $T_1$ may be arranged so that the output of the secondary winding is in the same phase as the input signal on the primary winding, the turns ratio of the transformer $T_1$ being the same as illustrated in FIG. 7. Alternatively, a step-up transformer may be employed to increase the magnitude of the output signal from coil a of flux valve 13 by the known factor D, the necessary phase relationship being achieved by either of the means previously mentioned. Other arrangement will be obvious to those skilled in the art.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:

1. Apparatus for determining the direction of the earth's magnetic field comprising a plurality of substantially identical multi-coil magnetic field detectors adapted to be mounted separately in spaced locations on a vehicle and each adapted to provide output signals on its respective coils that define the direction of the substantially horizontal component of the earth's magnetic field at its respective location, said output signals including error signal components produced by substantially horizontal deviation magnetic field components at each location, the direction of said deviation field at each location being the same but the magnitude thereof differing by a known factor, and means responsive to both detectors for providing a measure of the true magnetic heading of the vehicle, said last-mentioned means comprising means interconnecting corresponding coils of said detectors to combine the corresponding output signals of the two detectors in a subtractive manner, signal modifying means in said interconnecting means for substantially equalizing the deviation signal components in the corresponding output signals of said two detectors, thereby to produce a plurality of resultant signals defining substantially only the horizontal component of the earth's field, a control transformer synchro having coils respectively coupled to receive said resultant signals and adapted to produce an output signal whenever the axis of the rotor winding is in a direction different from the direction normal to the magnetic field established in said control transformer by said resultant signals, and direction indicating means coupled to said control transformer and responsive to the output signal therefrom to provide an indication of the true heading of said vehicle.

2. The combination claimed in claim 1 wherein said direction indicating means is comprised of a control amplifier coupled to the rotor winding of said control transformer and responsive to signals therefrom, a phase sensitive reversible motor electrically coupled to said amplifier, a directional gyroscope mechanically coupled to the rotor of said motor and to the rotor of said control transformer thereby forming a servo loop, and a compass card and indexing means one of which is movable with said directional gyroscope to indicate the direction thereof relative to the other which represents the heading of said craft.

3. The combination claimed in claim 1 wherein said indicating means is a compass repeater comprising a rotatable shaft coupled to the rotor of said control transformer, a compass card and an index positioned at one end of said shaft and one of which is fixed to said shaft, a phase sensitive reversible motor coupled to the other end of said shaft, and amplifying means coupled to the rotor of said control transformer and responsive thereto for supplying signals to said motor whenever said compass card indicates a direction relative to the heading of said craft different from the relative direction of the horizontal component of the earth's field.

4. A compass system for determining the heading of a supporting craft relative to the horizontal component of the earth's magnetic field, said system including apparatus responsive to the total magnetic field at two spaced positions on said craft wherein said total magnetic field includes the horizontal component of the earth's magnetic field and the horizontal component of a known extraneous deviation magnetic field which is constant in direction and magnitude irrespective of the heading of the craft, said deviation field being in the same direction but differing in magnitude by a known factor at said spaced positions, said apparatus comprising first and second flux valve signal transmitters respectively positioned at said two positions on said craft and being physically oriented 180° with respect to each other, interconnecting means for coupling together corresponding pick-up coils of said two flux valves to combine the output signals thereof in phase opposition, means included in said interconnecting means for reducing by said known factor the magnitude of the output signal of the flux valve at the one of said positions where the deviation field is stronger, whereby the deviation signal components of said two flux valves substantially cancel leaving substantially only a component signal representing the horizontal component of the earth's field, a control transformer synchro having its stator windings parallel coupled to the interconnected windings of said flux valves, a control amplifier and a motor successively coupled to the rotor of said control transformer, and direction indicating means mechanically coupled to said motor and said control transformer rotor in a manner to be positioned in response to said control transformer output signal to indicate the heading of said craft relative to the direction of the horizontal component of the earth's magnetic field.

5. The combination claimed in claim 4 wherein said compass system is a slaved gyro-magnetic compass system and said direction indicating means is comprised of a directional gyroscope.

6. The combination as claimed in claim 4 wherein said indicating means is comprised of a compass repeater.

7. Apparatus for determining the direction of the earth's magnetic field comprising first and second flux valves each having a plurality of pick-up windings angularly disposed with respect to each other, said flux valves being mounted at spaced positions and each adapted to provide output signals representing the direction of the substantially horizontal component of the earth's magnetic field at its respective position, said output signals including error signals produced by the horizontal component of a known extraneous deviation field at each position, the direction of said deviation field at each of said positions being the same but the magnitude differing by a known factor, interconnecting means respectively connecting corresponding pick-up windings of said flux valves to combine the output signals of said flux valves in phase opposition, means included in said interconnecting means for operating on the output signals of said flux valves in accordance with said known factor to substantially equalize and thereby cancel the respective error signals produced by said deviation fields, whereby the combined output signals of said two flux valves are signals representing only the horizontal component of the earth's magnetic field, a control transformer synchro having a rotatable rotor winding and a plurality of stator windings, said stator windings being respectively coupled to corresponding interconnected pick-up windings of said flux valves, whereby the stator windings of said control transformer are energized by signals representing only the horizontal component of the earth's magnetic field, said rotor winding being connected through a control amplifier to a motor, and indicating means mechanically coupled to said motor and to the rotor of said control transformer and operating in response to the output signals of said rotor winding to indicate the direction of the craft relative to the horizontal component of the earth's magnetic field.

8. Apparatus for determining the direction of the earth's magnetic field comprising first and second flux valves each having a plurality of secondary windings angularly disposed with respect to each other, said flux valves being physically oriented 180° with respect to each other and being respectively mounted at spaced positions on a supporting craft and each adapted to provide output signals representing the direction of the substantially horizontal component of the total magnetic field at each location, said output signals including error signals produced by the horizontal component of a known deviation field present at each position, the direction of said deviation field at each of said positions being the same but the magnitude differing by a known factor, means responsive to the output signals of said two flux valves for substantially cancelling said error signals, said last-named means comprising interconnecting networks coupling together corresponding coils of said flux valves and including adjustable impedance means for reducing by said known factor the magnitudes of the output signals of the flux valve located at the position where said deviation field is greater, whereby the combined output signals of said two flux valves obtained from the respective interconnecting networks are signals representing only the horizontal component of the earth's magnetic field, a control transformer synchro having a plurality of stator windings respectively coupled to corresponding interconnected stator windings of said flux valves, whereby the stator windings of said control transformer are energized by the signals representing only the horizontal component of the earth's magnetic field, said rotor winding being connected through a control amplifier to a motor, and direction indicating means mechanically coupled to said motor and to the rotor of said control transformer and operating in response to the output signals of said rotor winding to indicate the direction of the craft relative to the horizontal component of the earth's magnetic field.

9. The combination as claimed in claim 1 wherein each of said interconnecting means includes a transformer whose turns ratio of the windings is substantially equal to said known factor.

10. The combination as claimed in claim 9 wherein said magnetic field detectors are oriented in the same direction relative to each other and the input and output signals on the winding of said transformer are in 180° phase opposition with respect to each other.

References Cited by the Examiner

UNITED STATES PATENTS

| | | | |
|---|---|---|---|
| 2,383,461 | 8/1945 | Esval et al. | 33—222.7 |
| 2,393,670 | 1/1946 | White. | |
| 2,581,436 | 1/1952 | McCarthy | 33—224 X |
| 2,597,135 | 5/1952 | Stuart | 33—224 |
| 2,887,872 | 5/1959 | Halpern et al. | 73—1 |
| 2,887,873 | 5/1959 | Halpern et al. | 73—1 |
| 2,900,736 | 8/1959 | Harvey | 33—224 |

FOREIGN PATENTS 775,440   5/1957   Great Britain.

LOUIS R. PRINCE, *Primary Examiner.*

ISAAC LISANN, ROBERT B. HULL, *Examiners.*

SAMUEL S. MATTHEWS, *Assistant Examiner.*